United States Patent [19]
Khuzaie

[11] 3,889,537
[45] June 17, 1975

[54] VENTURI ARRANGEMENT

[75] Inventor: Kamel Ahmad Khuzaie, San Jose, Calif.

[73] Assignee: General Electric Company, San Jose, Calif.

[22] Filed: Oct. 11, 1973

[21] Appl. No.: 405,266

[52] U.S. Cl. .................................................. 73/213
[51] Int. Cl. .............................................. G01f 1/00
[58] Field of Search ........................ 73/213; 138/44

[56] References Cited
UNITED STATES PATENTS

| | | | |
|---|---|---|---|
| 2,284,013 | 5/1942 | Pardoe | 73/213 |
| 2,681,575 | 6/1954 | Borden | 73/213 X |
| 3,018,799 | 1/1962 | Volkmann et al. | 73/213 X |
| 3,774,645 | 11/1973 | Pompa | 73/213 |

Primary Examiner—Richard C. Queisser
Assistant Examiner—John P. Beauchamp
Attorney, Agent, or Firm—Ivor J. James, Jr.; Samuel E. Turner; Sam E. Laub

[57] ABSTRACT

In a fluid flow rate measuring arrangement for use in relatively large pressure pipes, the inlet and throat sections of a venturi are formed integrally with a section of pipe wherein a pressure tap in the throat section of the venturi is communicated to the exterior of the pipe by a passage through the solid metal of the section of pipe whereby internal pressure tubes are eliminated.

6 Claims, 4 Drawing Figures

VENTURI ARRANGEMENT

BACKGROUND

There are many instances where it is necessary to measure the flow rate of fluids. In a steam power plant, for example, water is circulated through a heat exchanger, which may be, for example, a nuclear reactor core, situated in a pressure vessel. Steam thus produced is taken from the pressure vessel, at a pressure of 1000 Psig or more and at temperatures in the order of 500°F or more, through steam lines and applied to a steam turbine. Exhaust steam from the turbine is condensed and returned to the pressure vessel as feed water. It is for a variety of reasons desirable to measure the flow rate of feed water to the pressure vessel as well as the flow rate of steam through the main steam lines to the turbine.

A well-known device, well adapted to measure fluid flow rate is a venturi. A venturi is a fluid flow constriction usually consisting of a pair of truncated cone-like sections connected at their small ends to form a throat section. The velocity of a fluid flowing through the venturi increases to a maximum through the throat section with the result that the fluid pressure decreases in the throat section. With such a venturi placed in a line, the fluid flow rate therethrough can be measured by a calibrated differential pressure meter connected to a pressure tap in the throat section of the venturi and to a line pressure tap preferably placed in the fluid line upstream of the venturi.

A venturi of relatively small size can be constructed with solid walls, either with a uniform outside diameter or a tapered outside diameter. In either case, the pressure tap at the throat section is readily accessible for attachment of an external pressure tube. However, when a venturi is to be used in lines of large size, for example, feed water and steam lines of power plants, of as much as 2 feet in diameter, several problems arise. To maintain the integrity of such high pressure lines and for construction convenience, prior venturies for use in large pipes have been formed as separate elements and placed inside the pipes. Usually such a venturi element is formed with side walls of substantially uniform thickness thus leaving an annular space between the venturi and the pipe wall when the venturi is inserted in the pipe. Thus a pressure tube attached to a tap at the venturi throat must traverse this annular space and be connected through the pipe wall. Such a venturi is quite long, in the order of five feet. This creates a problem of differential thermal expansion as the plant is, for example, brought on-line from the shutdown or stand-by condition. For this reason the venturi is attached to the pipe only at one transverse plane, for example, at either end or at the throat. In any case, the pressure tube connection must accommodate thermal and vibration induced movements between the venturi pressure tap and the connection through the pipe wall.

In a known prior arrangement the venturi is fixed inside the pipe by an annular supporting ring welded between the inside of the pipe and the outside of the venturi at the throat section of the venturi. A radial passage through this support ring provides a pressure tap connection. This arrangement is undesirably expensive and complicated.

In another known arrangement, one end of the venturi is welded to the inside of the pipe; a pressure tube is connected to a pressure tap at the venturi throat and the pressure tube is passed through a clearance hole in the wall of the pipe. A standpipe or cupola is fitted around the clearance hole in the pipe and the pressure tube is run through this cupola. The cupola is made sufficiently long to provide for flexing of the pressure tube within the cupola as thermal and vibration induced movement between the venturi and the pipe takes place. This arrangement requires an undue amount of space to accommodate the radially extending cupola. This is particularly true where more than one pressure connection must be made to the venturi to provide redundant flow measuring systems.

In another known arrangement, the pressure tap at the throat of a venturi is connected to a circumferentially offset pressure take-off fitting in the wall of the pipe by means of a relatively long metal pressure tube which is curved circumferentially in the annular space between the venturi and the inner pipe wall to thus provide a length of pressure tube sufficient to accommodate thermal and vibration induced movements without the use of space external of the pipe. (Such an arrangement is shown in copending U.S. Patent application Ser. No. 370,427, filed 15 June 1973, now U.S. Pat. No. 3,859,853.)

SUMMARY

An object of this invention is to eliminate internal pressure tubes and the problems thereof of the prior venturi arrangements.

This and other objects are achieved, according to a first embodiment of the invention by forming the convergent inlet section and the throat section of the venturi integrally with a pipe flange whereby a pressure tap in the throat section is connected to the exterior of the flange by a passage through the solid metal of the flange so that the need of a flexible, internal pressure tube is eliminated. The diffuser section is formed separately and then welded, at its small diameter end, to the throat section.

The thus formed combined flange and venturi is then inserted into a section of pipe, of the fluid conducting line, and the flange is welded thereto. The outlet end of the diffuser section is formed with an outside diameter somewhat smaller than the inside diameter of the pipe so that at a given ambient temperature there is an annular space therebetween to facilitate insertion of the venturi into the pipe. Advantageously, this diffuser section is formed of a metal having a higher thermal coefficient of expansion than the metal of the pipe whereby the outlet end of the diffuser expands to contact the adjacent inner surface of the pipe at the higher temperature of operating conditions, whereby vibration of the diffuser with respect to the pipe is prevented to thereby avoid vibration induced failure of the venturi.

A second embodiment of the invention is adapted for welding into the fluid line rather than connected therein by flanges. Thus in the second embodiment, the venturi inlet and throat sections are formed integrally with an unflanged section of pipe which, after the diffuser section of the venturi is welded to the throat section thereof, is inserted into and welded to the pipe line. This second embodiment is otherwise similar to the first embodiment.

DRAWING

The invention is described more specifically hereinafter with reference to the accompanying drawing wherein.

GENERAL DESCRIPTION

Figure 1:
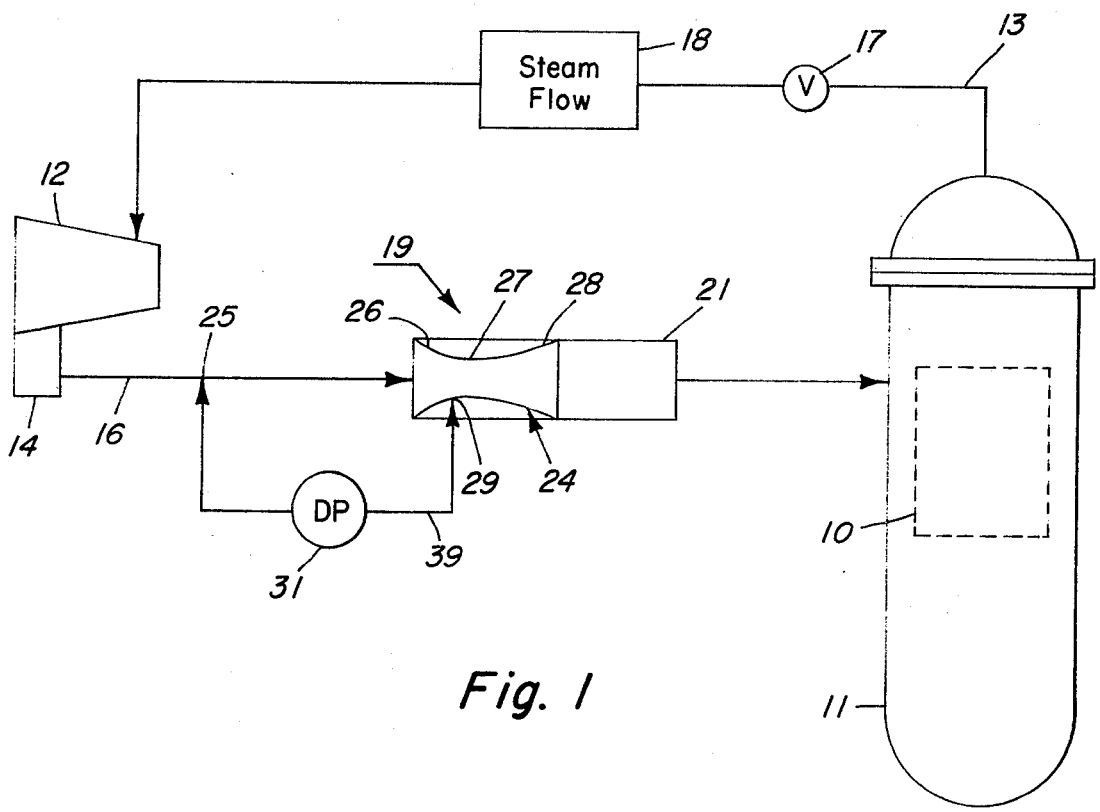
FIG. 1 is a schematic illustration of a steam power plant.

As an example use of the present invention, a steam power plant is illustrated in simplified schematic form in FIG. 1. Steam is produced by well-known means, such as a nuclear reactor core 10, in a pressure vessel 11 and is fed to a load, such as a turbine 12, through a steam line 13. Condensate is collected in a condenser 14 and returned as feedwater to the pressure vessel 11 through a feedwater line or pipe 16. Included in the steam line 13 is a shut-off valve 17 and a steam flow rate measuring device 18.

The feedwater line or pipe 16 includes a feedwater flow rate arrangement 19. In accordance with the invention, the flow rate arrangement 19 includes a pipe section 21. The pipe section 21 contains a venturi 24 formed of a convergent inlet section 26, a constricting throat section 27 and a divergent diffuser section 28. A pressure tap 29 is formed in the throat section 27. The pressure tap 29 and an upstream pressure tap 25 are connected by suitable pressure conduit means, such as a pressure tube 39, to a differential pressure meter 31.

As the feedwater flows through the constricting throat 27 of the venturi 24, its velocity increases and, therefore, the pressure at the throat pressure tap 29 decreases relative to feedwater line pressure at pressure tap 25. As is well-known this pressure difference is a function of the fluid flow rate through the line. The meter 31 registers this pressure difference and it can be calibrated in well-known manner to register the feedwater flow rate through the line 16. (A similar arrangement can be used for the steam flow rate device 18.)

First Embodiment

Figure 2:
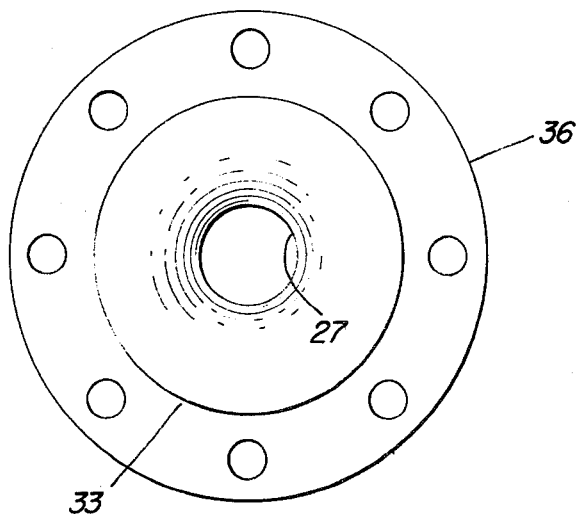
FIG. 2 is an end view of the first embodiment of the invention.
Figure 3:
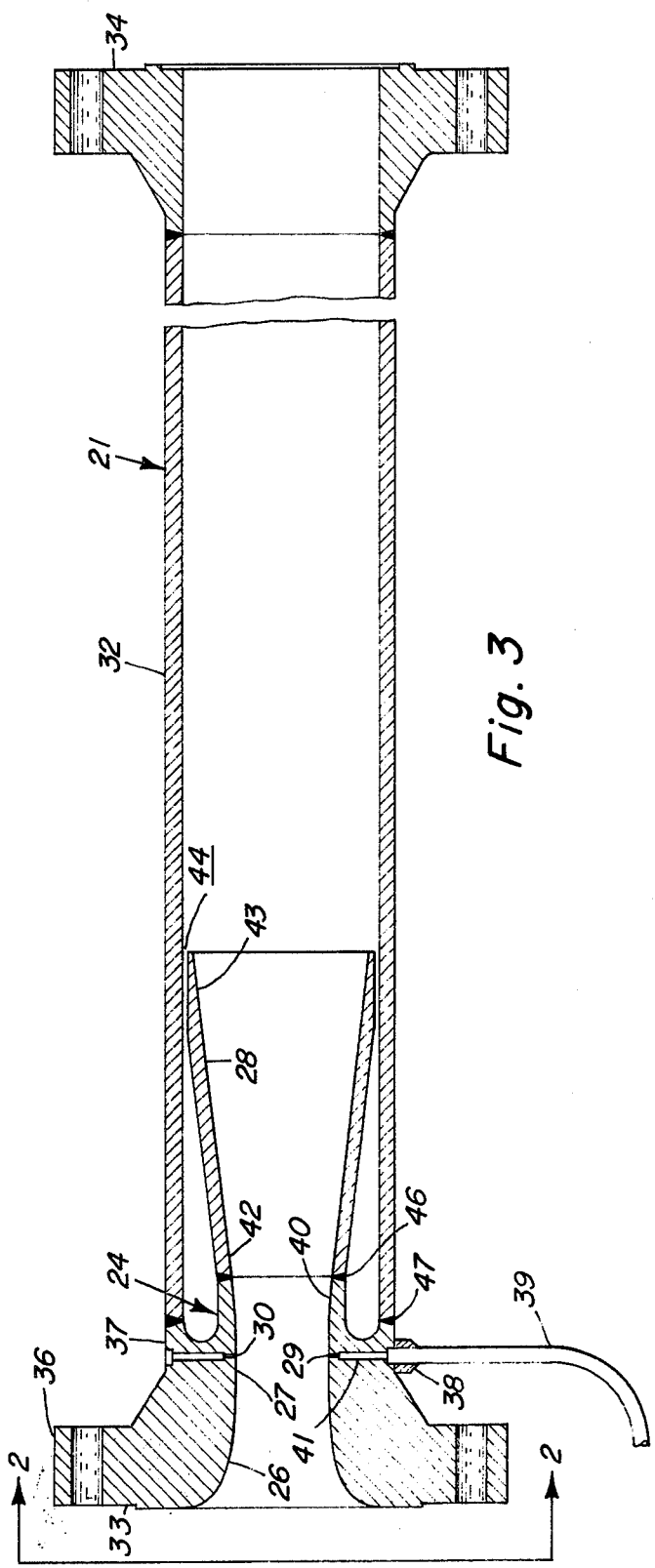
FIG. 3 is a longitudinal cross section view of the embodiment of the invention of FIG. 2.

The pipe section 21 and the venturi 24 formed therein in accordance with the first embodiment the invention are illustrated in greater detail in FIGS. 2 and 3, FIG. 2 being a (left) end view and FIG. 3 being a longitudinal section view. The pipe section 21 includes a cylindrical center pipe section 32, an upstream or inlet flange 33, and a downstream or outlet flange 34, the flanges 33 and 34 being adapted for bolting and sealing to suitable mating flanges in the fluid line such as the line 16 (FIG. 1).

The flange 33 includes a large diameter rim portion 36 and a hub portion 37 of diameter similar to that of the center pipe section 32 and adapted for welding thereto. It is a feature of the invention that the inlet section 26 and the throat section 27 of the venturi 24 are formed integrally with the flange 33. (This integral structure may be formed, for example, by forging to general shape with subsequent finish machining.)

By thus forming the throat section 27 integrally with the flange 33, the pressure tap 29 can be connected to an exterior fitting 38 and pressure tube 39 by a passage 41 through the solid metal of the flange 33. (Additional pressure taps 30, as may be necessary for redundant systems, may be similarly connected.) This arrangement completely eliminates the internal pressure tubes that have been the source of problems in the prior art arrangements.

Because of its relatively long length, the divergent diffuser section 28 is most conveniently formed as a separate piece with an inlet end 42 having diameters substantially equal to the diameters of the outlet end of the throat section 27 and with an outlet end 43 having an outer diameter (at the ambient or construction temperature) somewhat less than the inside diameter of the pipe section 32 to thereby provide, at construction temperature, a clearance space or gap 44 between the outlet end 43 and the adjacent inner surface of the pipe section 32. This gap 44 facilitiates insertion of the diffuser section 28 into the pipe section 32 during construction. (The outlet end of the throat section 27 may be formed with a divergent taper portion 40 as a lead in to the diffuser section 28.)

It is another feature of the invention that the diffuser section 28 is formed of a metal having a greater thermal coefficient of expansion than the material of which the pipe section 32 is formed. Thus when the venturi arrangement is placed in operation at an operating temperature greater than the ambient construction temperature, the outlet end 43 undergoes greater expansion than the pipe section 32 whereby the outer surface of end 43 contacts and bears against, the adjacent inner surface of the pipe section 32 to prevent vibration of the diffuser section 28 as mentioned hereinbefore. (The angle of divergence of the diffuser section 28 may be in the range of 7°–15°.)

The method of constructing the venturi arrangement of the invention is as follows: The integral flange 33 and inlet and throat sections 26 and 27 of the venturi 24 is formed; and the diffuser section 28 is formed. The inlet end 42 of diffuser section 28 is welded, by a weld 46, to the outlet end of the throat section 27. The thus assembled flange-venturi is inserted into the pipe section 32, properly centered with a uniform annular gap 44, and welded thereto by a weld 47.

In a specific version of the first embodiment of the invention for use, for example, in the feedwater line of a steam power plant (as illustrated in FIG. 1) the pipe section 21 has an overall length of about 155 inches (including flanges 33 and 34). The pipe section 32 is formed of carbon steel with an inside diameter of about 15.25 inches and a wall thickness of about 1.125 inches. The flange 33, with integral venturi inlet and throat sections 26 and 27, is formed of stainless steel with a diameter of the rim portion 36 of about 36 inches, an inside diameter of the hub portion 37 of about 15.25 inches, an inside diameter of the throat section 27 of about 7.78 inches and a (longitudinal) length of about 16.5 inches. The tapered portion 40 has a length of about 3 inches and the pressure tap 29 is located about 10.4 inches downstream from the face of flange 33. The diffuser section 28 is formed of stainless steel with a length of about 31.5 inches, a wall thickness of about 1 inch and an angle of divergence of about 13°. The clearance gap 44 is about 0.015 inch at an ambient temperature of about 70°F for a design operating temperature in the range of about 350°–400°F.

Second Embodiment

Figure 4:
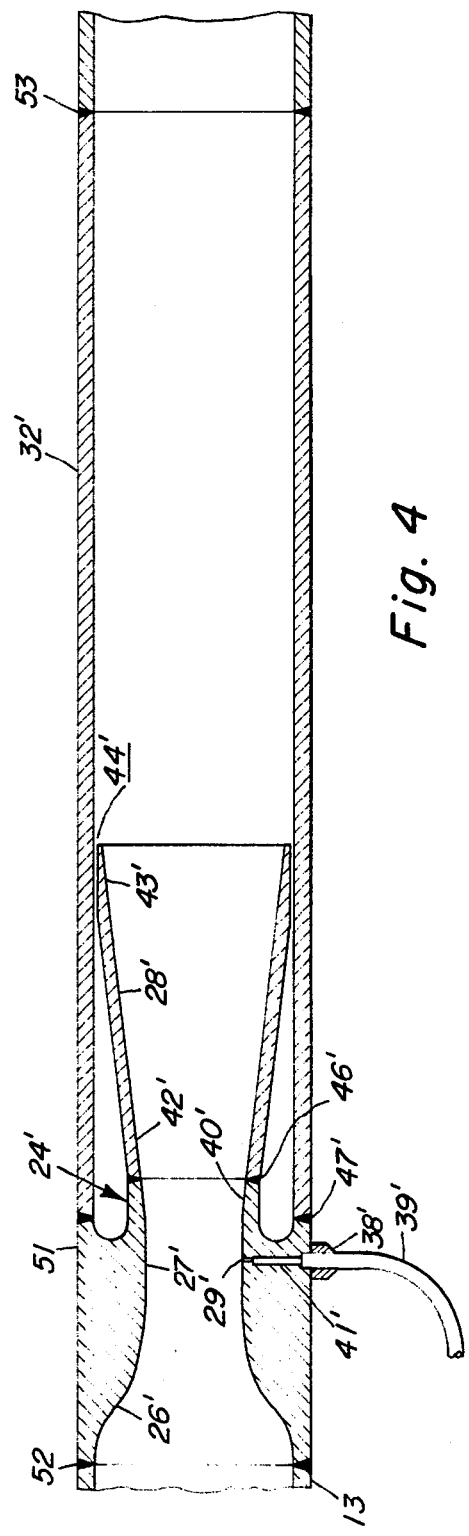
FIG. 4 is a longitudinal cross section view of a second embodiment of the invention.

Illustrated in FIG. 4 is a flangeless embodiment of the invention which is well adapted for welding into a pipe line such as the steam line 13 (FIG. 1) for use as the steam flow measuring device 18 and for use in other such lines where flanged or other non-welded connections are not permitted.

This second embodiment is similar to the first embodiment described hereinbefore with reference to FIGS. 2 and 3 and primed reference numbers are applied in FIG. 4 to the similar parts.

In the second embodiment of the invention, as illustrated in FIG. 4, the converging inlet section 26' and the throat section 27' of the venturi are formed integrally with a section of pipe 51 having inside and outside diameters similar to the pipe 13 and to the pipe section 32' into which the venturi is inserted.

Pressure tap 29' is connected to an exterior fitting 38' and pressure tube 39' by a passage 41' through the solid metal of the pipe section 51 thus eliminating any internal pressure tubes.

The divergent diffuser section 28' is formed as a separate piece with an inlet end 42' having diameters matching the outlet end of the throat section 27' and an outlet end 43' having an outside diameter (at the ambient or construction temperature) slightly less than the inside diameter of pipe section 32' to provide, at construction temperature, a clearance space or gap 44' between the outside surface of the outlet end 43' and the adjacent inner surface of pipe section 32'. The gap 44' facilitates insertion of the diffuser section 28' into the pipe section 32' during construction. (The outlet end of the throat section 27' may be formed with a divergent taper portion 40' as a lead in to the diffuser section 28'.) The diffuser section 28' is formed of a metal (such as stainless steel) having a greater thermal coefficient of expansion than the metal (such as carbon steel) of which the pipe section 32' is formed. Thus, when the venturi arrangement is placed in operation at an operating temperature greater than the ambient construction temperature, the outlet end 43' undergoes greater expansion than the pipe section 32' whereby the outer surface of end 43' contacts and bears against, the adjacent inner surface of the pipe section 32. (The angle of divergence of the diffuser section 28' may be in the range of 7°–15°.)

The method of constructing the venturi arrangement of FIG. 4 and connecting it into the pipe line 13 is as follows. The pipe section 51 with integral venturi inlet section 26' and throat section 27' is formed; and the diffuser section 28' is formed. The inlet end 42' of diffuser section 28' is welded, by a weld 46' to the outlet end 40' of the throat section 27'. The thus assembled pipe section-venturi is inserted into pipe section 32', properly centered with a uniform annular gap 44', and welded thereto by a weld 47'. The pipe sections 51 and 32' may then be connected in the pipe line 13 by welds 52 and 53.

The various dimensions of the venturi arrangement of FIG. 4, may be similar to the dimensions of the first embodiment of FIGS. 2 and 3 for use in pipe lines of similar size. However, when used in steam lines, for example, as the steam flow measuring device 18 in line 13 (FIG. 1), the clearance gap 44' may be somewhat larger because of the higher (for example, 500°–600°F) design operating temperature.

What is claimed is:

1. For use in a pipe line for conducting a flow of fluid, a flanged section of pipe for removable connection in said pipe line and a venturi formed in said section of pipe comprising: a convergent inlet section and a throat section of said venturi formed integrally with a flange, said flange having an outside diameter greater than the outside diameter of said pipe and an inside diameter substantially equal to the inside diameter of said pipe, said throat section having an inside diameter less than the inside diameter of said pipe, said flange being welded to an upstream end of said section of pipe; a pressure tap formed in the inner surface of said throat section and connected by a passage through said flange to an exterior surface of said flange; and a divergent diffuser section having a small-diameter inlet end welded to said throat section and having a larger diameter outlet end spaced from an inner surface of said pipe at a given ambient temperature, said diffuser section being formed of a metal having a higher thermal coefficient of expansion than the metal of which said pipe is formed whereby at an operating temperature greater than said ambient temperature said outlet end of said diffuser section contacts said inner surface of said pipe.

2. The venturi of claim 1 wherein said diffuser section of said venturi has a length of about four times its minimum inside diameter and an angle of divergence of about 13°.

3. The venturi arrangement of claim 1 wherein said diffuser section is formed of stainless steel and wherein said section of pipe is formed of carbon steel.

4. For use in a pipe line for conducting a flow of fluid, a length of pipe having a venturi formed therein and adapted for connection in said pipe line by welding comprising: a first section of said length of pipe having an upstream end and a downstream end and having inside and outside diameters substantially equal to those of the pipe of said pipe line and a convergent inlet section and a throat section of said venturi formed integrally with said first pipe section, said throat section having an inside diameter less than the inside diameter of said first pipe section; a pressure tap formed in the inner surface of said throat section and connected by a passage through said integral throat section and first pipe section to an exterior surface of said first pipe section; a second section of said length of pipe having an upstream end and a downstream end, said upstream end being welded to said downstream end of said first section, and a divergent diffuser section of said venturi having an inlet end welded to said throat section and an outlet end spaced from an inner surface of said second pipe section at a given ambient temperature, said diffuser section being formed of a metal having a high thermal coefficient of expansion than the metal of which said section is formed whereby at an operating temperature greater than said ambient temperature said outlet end of said diffuser section contacts said inner surface of said second section.

5. The venturi of claim 4 wherein said diffuser section has a length of about four times its minimum inside diameter and an angle of divergence of from 7° to 15°.

6. The venturi arrangement of claim 4 wherein said diffuser section is formed of stainless steel and wherein said section of pipe is formed of carbon steel.

* * * * *